United States Patent
Wang et al.

(10) Patent No.: US 8,774,023 B2
(45) Date of Patent: Jul. 8, 2014

(54) METHOD AND SYSTEM FOR DETECTING CHANGES IN NETWORK PERFORMANCE

(75) Inventors: Jia Wang, Randolph, NJ (US); Zihui Ge, Secaucus, NJ (US); Ajay Mahimkar, Woodbridge, NJ (US); Aman Shaikh, Berkeley Heights, NJ (US); Jennifer Yates, Morristown, NJ (US); Yin Zhang, Austin, TX (US); Joanne Emmons, Howell, NJ (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 328 days.

(21) Appl. No.: 12/887,903

(22) Filed: Sep. 22, 2010

(65) Prior Publication Data

US 2012/0069747 A1 Mar. 22, 2012

(51) Int. Cl.
*H04L 12/26* (2006.01)
(52) U.S. Cl.
USPC ............................................... 370/252
(58) Field of Classification Search
USPC ............ 370/241, 252; 709/224; 455/424, 524
See application file for complete search history.

(56) References Cited

U.S. PATENT DOCUMENTS

| | | | |
|---|---|---|---|
| 2004/0088400 A1* | 5/2004 | Daggett | 709/224 |
| 2006/0176824 A1* | 8/2006 | Laver et al. | 370/241 |
| 2009/0075648 A1* | 3/2009 | Reed et al. | 455/424 |
| 2012/0196644 A1* | 8/2012 | Scherzer et al. | 455/524 |

\* cited by examiner

*Primary Examiner* — Albert T Chou
(74) *Attorney, Agent, or Firm* — Fay Kaplun & Marcin, LLP

(57) ABSTRACT

A system and method are provided for identifying a change point in a set of data. The system performs the method by receiving a set of data. The data indicates a plurality of performance measurements from a measurement point in a network. Each of the plurality of measurements represents a single type of performance measurement made at the measurement point at each of a corresponding plurality of points in time. The method also includes dividing the set of data into a plurality of data points in a chronological order. Each data point has a value corresponding to the performance measurements. The method also includes ranking the data points in an ascending order, calculating a cumulative sum for each of the data points, calculating a change score for the set of data points. A change point is identified in the data set if the change score exceeds a predetermined confidence level.

20 Claims, 3 Drawing Sheets

System 100

METHOD AND SYSTEM FOR DETECTING CHANGES IN NETWORK PERFORMANCE

BACKGROUND

Networks continue to develop to support new functions, improve reliability and performance, and decrease operating costs. In order to support such development, the hardware, software, and configuration of such networks may periodically be upgraded.

SUMMARY

The exemplary embodiments describe a method for identifying a change point in a set of data. The method includes receiving a set of data, the data indicating a plurality of performance measurements from a measurement point in a network, each of the plurality representing a single type of performance measurement made at the measurement point at each of a corresponding plurality of points in time. The method further includes dividing the set of data into a plurality of data points in a chronological order, each data point having a value corresponding to the performance measurements, ranking the data points in an ascending order, calculating a cumulative sum for each of the data points, calculating a change score for the set of data points and identifying a change point in the data set, if the change score exceeds a predetermined confidence level.

The exemplary embodiments further describe a system for identifying change points in data collected by network devices such as routers. The system includes a plurality of network devices, each network device recording a set of data, the data indicating a plurality of performance measurements for each network device, each of the plurality of performance measurements representing a single type of performance measurement made at each network device at each of a corresponding plurality of points in time. The system further includes an analysis device receiving the set of data from each of the network devices and dividing the set of data into a plurality of data points in a chronological order, each data point having a value corresponding to the performance measurements, ranking the data points in an ascending order, calculating a cumulative sum for each of the data points, calculating a change score for the set of data points and identifying a change point in the data set, if the change score exceeds a predetermined confidence level.

The exemplary embodiments also describe a non-transitory computer readable storage medium storing a set of instructions executable by a processor, to perform a method of identifying a change point in a set of data. The set of instructions are operable to receive a set of data, the data indicating a plurality of performance measurements from a measurement point in a network, each of the plurality representing a single type of performance measurement made at the measurement point at each of a corresponding plurality of points in time, divide the set of data into a plurality of data points in a chronological order, each data point having a value corresponding to the performance measurements, rank the data points in an ascending order, calculate a cumulative sum for each of the data points, calculate a change score for the set of data points and identify a change point in the data set, if the change score exceeds a predetermined confidence level.

DETAILED DESCRIPTION

Figure 1:
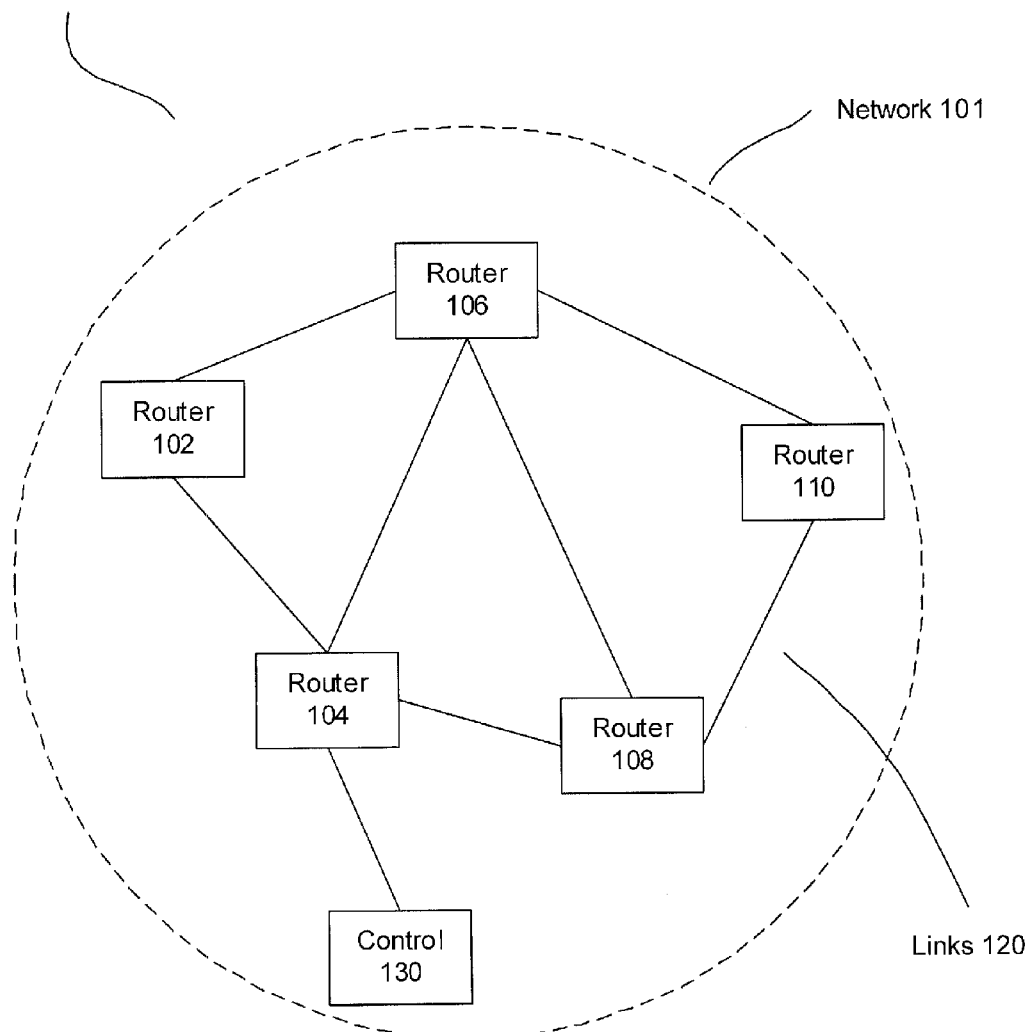
FIG. 1 shows an exemplary system.

The exemplary embodiments may be further understood with reference to the following description and the appended drawings, wherein like elements are referred to with the same reference numerals. The exemplary embodiments describe methods and systems for detecting changes in network performance that may be caused by network upgrades.

Network providers may continually upgrade networks in order to support new functions and applications, improve performance and reliability, and decrease operational costs. These upgrades may be planned upgrades or they may be reactive upgrades that are the result of external network conditions, for example, Denial of Service (DoS) attacks or worm propagations. Possible upgrades may include the implementation of hardware, firmware or software, the introduction of new network or service features, and changes to network and/or device configuration. Typically, the changes are made one network element at a time (e.g., at a single router) and then applied across multiple network elements. While changes such as, for example, the introduction of new software governing the operation of a router may be tested in a controlled environment prior to implementation, such testing may not necessarily be able to accurately predict all possible results of implementation into a larger operational network environment. Thus, when such upgrades occur, it is important for overall network performance to be monitored in order to detect any unintended changes or results.

In an exemplary embodiment, the monitoring of the network may include the monitoring of different types of key performance indicators ("KPIs") at various points in the network. KPIs may include customer-perceived performance-related metrics (e.g., packet loss, delays, service glitches, etc.), network-related performance metrics (e.g., protocol flaps, line card crashes, etc.), and network element health (e.g., router CPU utilization, memory available, etc.). Monitoring may occur at routers or at various other points within a network. According to the exemplary embodiments, monitoring a behavior change in these KPIs may be a good indicator of whether the upgrades have had the desired impact or to discover any new or unexpected impacts caused by the upgrades. A behavior change may include a persistent change in network performance induced by a network trigger such as an upgrade. It should be noted that throughout this description, the term "trigger" may be used to characterize any event that materially alters the network. For example, a software upgrade may be a trigger. However, triggers are not limited to upgrades. The behavior change may be instantaneous and result immediately after the trigger (e.g., a KPI has an immediate level shift) or may also be gradual (e.g., a KPI slowly ramps up over time). Behavior changes may also correlate across multiple locations, typically induced by the same triggers applied across different network elements.

Moreover, in large-scale networks, monitoring may occur at a large number of points, and performance changes may occur due to a large number of changes in network configuration being implemented by network maintenance personnel or automated network updating. Therefore, it is important to be able to identify various points at which network performance has experienced a change, and distinguish between persistent changes and short-term transient changes. To this end, the exemplary embodiments may monitor each KPI in a network, identify change points in each KPI along with determining a significance score for each change point, and detect aggregated behavior changes across multiple network elements where no significant changes are detected at any individual elements.

FIG. 1 illustrates an exemplary system 100. The system includes a plurality of routers 102, 104, 106, 108 and 110 that are connected to one another in a network 101. The network 101 includes a plurality of links 120 joining the routers to one another, but because the number and arrangement of these links 120 is extraneous to the scope of the exemplary embodiments, they are not identified individually in this disclosure. The network 101 may be a computing network, a communications network, etc. Those of skill in the art will understand that the number and arrangement of the routers is only exemplary and that an unlimited number of variations may be possible in other embodiments. The system 100 may also include a control point 130, at which a user may issue commands to the routers 102-110, performance measurements for the routers 102-110 may be received, etc. Those of skill in the art will understand that each of the routers 102-110 may include memory storing firmware and software, a processor executing the firmware and software, one or more network interfaces, etc; for clarity, these elements are not shown in FIG. 1. Those skilled in the art should also understand that an actual network may have many more types of components in addition to routers (e.g., network servers, network appliances, memory devices, etc.). However, for the purposes of describing the exemplary embodiments, the network 101 is simplified to include only the routers 102-110 and the control point 130.

Thus, in the exemplary embodiment, the data sources for monitoring the KPIs of the network 101 may include for example, the router SNMP MIBs (Simple Network Management Protocol Management Information Base) and the router syslogs. Typically, the SNMP MIBs capture measurement of various parameters on the router including counts of packets and bytes transmitted through router interfaces, packet errors, CPU loading, memory utilization, etc. External pollers collect values from the SNMP MIBs at regular intervals (e.g., every 5 minutes), providing a regular stream of average measurements that can be used in real time or stored historical for later analysis. The router syslogs are logs written by the routers in response to specific events on the routers. The router syslogs may capture a diverse range of events, including protocol and link state changes, error conditions, warning messages, environmental conditions, etc. By mining these data sources an immense range of KPIs may be monitored. Those skilled in the art will understand that other network elements may have different data sources from which the KPIs may be monitored.

In one exemplary embodiment, determining the behavior changes as a result of the upgrades, is accomplished by comparing the event series statistics (e.g., mean, median or the entire distribution) of the KPIs before and after the trigger over a certain time interval. A change score may then be used to quantify the magnitude of the changes. However, this approach may not be complete because due to overlapping impact of network triggers, choosing the right time interval is non-trivial and an incorrect choice may lead to an incorrect conclusion. In addition, this approach may not scale with large numbers of performance event series and number of triggers.

In another exemplary embodiment, the above shortcomings are addressed by identifying significant behavior changes in the performance event series and correlate them with the network triggers to identify the trigger/change point pairs of interest. The trigger and change points form a pair when they correlate in time and share the same location. In this way, the number of change detection tests is on the order of O(PL), where P is the number of performance event series and L is the number of spatial locations. Also, by correlating the change points with triggers, the triggers that do not cause behavior changes are eliminated. This exemplary embodiment is described in greater detail below.

Figure 2:
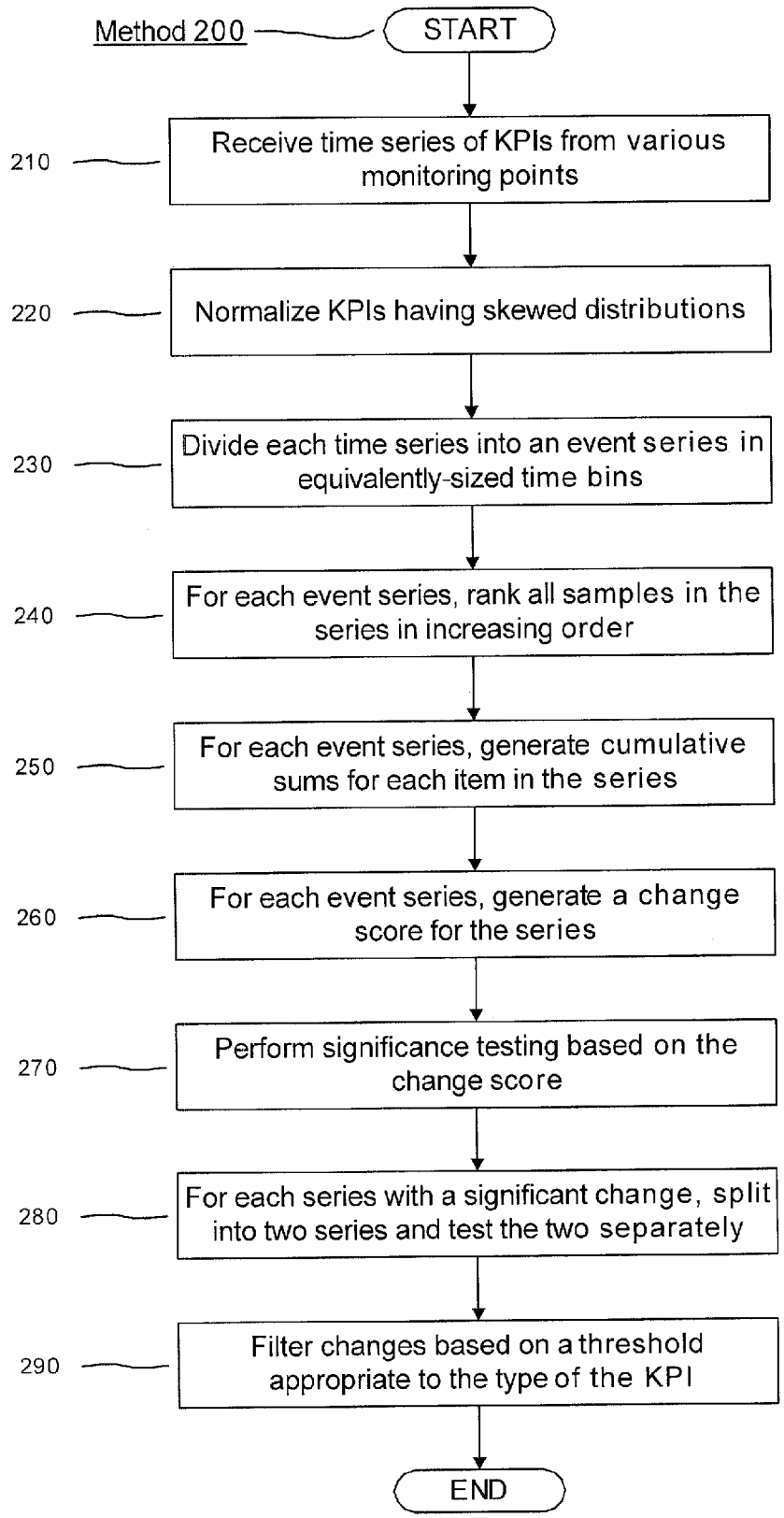
FIG. 2 shows an exemplary method for identifying change points in a series of performance measurements.

FIG. 2 illustrates an exemplary method 200 by which change points may be detected in a data set received from one or more KPIs in a network such as the network 101 of FIG. 1. In step 210, a time series for one or more KPI is received; for example, the KPI being measured may be a processor usage at each of the routers 102-110 during a time interval. Those of skill in the art will understand that in automated testing of a large-scale network, this may involve receiving a large number of KPI time series at a time and subsequently searching for changes in each KPI time series, and that, therefore, steps of the method 200 that may be described with reference to an individual data set may be repeated for each of a large number of data sets. A "time series" refers to a data set in which a set of KPI values is received, with each value corresponding to a point in time, typically at uniform time intervals. As described above, in the exemplary embodiment of monitoring router performance, the KPI parameters may be received or extracted from SNMP MIBs and/or from router syslogs.

In step 220, certain KPIs are normalized prior to generating an event series for the KPI. It is noted that step 220 is an optional step and does not need to be applied to each class of KPI. For example, certain KPIs may have a skewed distribution and the normalization process may be applied to these types of KPIs. However, KPIs having a normal distribution may not need to be normalized. An example of a KPI that may be normalized is a BGP (Border Gateway Protocol) hold time expiry across all interfaces on a router. As described above, it has been noted that the event count for such events for different interfaces have a skewed distribution, therefore, the KPI should be normalized. In this example, it may be considered that heavy hitter interfaces (e.g., those interfaces with significantly more events than other interfaces) should be eliminated from an aggregate analysis.

One approach to eliminating heavy hitters from the aggregate analysis may be to compute a count of events for each monitoring point. In addition, a mean and standard deviation are calculated for the counts of events across all monitoring points. Each monitoring point with an event count greater than six standard deviations greater than the mean is deemed a "heavy-hitter" and is removed from aggregation consideration. Thus, the aggregation may then occur for those interfaces that are not heavy hitter interfaces. As will be described in greater detail below, the change detection analysis may be performed on: (i) event-series at each individual interface; and (ii) event-series aggregation across non-heavy hitter interfaces. It is noted that the preceding is only exemplary and other methods for removing heavy hitters and/or other normalization methods may be used.

In step 230, an event series is created from each time series by dividing the time series into a number of equal time bins. For example, measurements may be taken at a frequency on the order of minutes, such as every five minutes, but may then be aggregated into larger time bins, such as a day. The value for each time bin may be the mean average of each measurement taken during the time bin (e.g., the mean average of each of 288 measurements taken at five-minute intervals during a day). This may minimize noise that may be present in data taken at a five minute time scale or hourly time scale; by aggregating the data, changes identified may be persistent and long-lasting. This may also minimize the size of the data set and speed computations.

In step 240, the n samples in an event series, which may be referred to as $X_1, X_2, \ldots X_n$, are ranked in increasing order with a rank $r_i$ assigned to each entry $X_i$. For example, the entry $X_i$ with the lowest value of all entries in the series may have a rank $r_i$ equal to 1, the entry $X_i$ with the highest value of all entries in the series may have a rank $r_i$ equal to n, and entries with intermediate values may have ranks $r_i$ between 1 and n. If multiple entries have the same value, an average rank may be assigned to each of them. It may be apparent to those of skill in the art that if there is a change-point in the event series, then higher ranks should dominate in either the earlier or later part of the series, and that, conversely, if the ranks are randomly distributed throughout the series then there is not a change point within the series.

In step 250, a cumulative sum is generated for each entry in the series. For each entry $X_i$, its cumulative sum $S_i$ may be defined as $S_i = S_{i-1} + (r_i - \bar{r})$, where $\bar{r}$ is equal to the mean value of all ranks $r_i$. In step 260, a change score $S_{diff}$ for the series is calculated as $S_{diff} = \max(S_i) - \min(S_i)$.

In step 270, significance analysis is performed to determine whether the change signified by the change score is statistically significant. This may be accomplished by creating random permutations of the entries in the event series (in one embodiment, 100 random permutations may be created, though this may be a configurable parameter), re-ranking each of the random permutations as described above with reference to step 240, calculating a cumulative sum for each of the random permutations as described above with reference to step 250, and calculating a change score for each of the random sums as described above with reference to step 260. A confidence level may be computed by identifying the portion of the random permutations with a change score less than the value $S_{diff}$ calculated above for the actual series in step 260, and a significant change may be identified where the confidence level is greater than a predetermined threshold. In one embodiment, the threshold may be 99%.

In step 280, recursive detection is performed in order to detect multiple change points within an event series. In this step, for each series for which a change point has been detected that meets the standard evaluated in step 270, the series is subdivided into two sub-series: one sub-series consisting of the entries before the change point, and one sub-series consisting of the entries after the change point. For each sub-series, steps 240 through 270 are repeated to determine whether another change point occurs. This may be repeated indefinitely, with sub-series further subdivided as necessary until no more change points occur, or until a maximum number of desired change points is reached. Those of skill in the art will understand that configuration changes, and their corresponding behavior changes, may typically be rare, and that it may therefore be appropriate to restrict the number of change points in this manner; however, in other embodiments, recursion may be performed until no more change points are detected.

In step 290, the change points that have been identified in the above steps are filtered based on the magnitude of the change before and after the point and the nature of the KPI being measured; this step is performed because a change of a small magnitude (e.g., a 1% increase in CPU usage) may be mathematically significant, but not operationally significant. The magnitude of a change may be determined by comparing a value of the KPI immediately before the change point to a value of the KPI immediately after, by comparing an average of a set of KPIs before the change point (e.g., the five KPI values immediately before the change point, all the KPI values before the change point, etc.) to an average of a set of KPIs after the change point (e.g., the five KPI values immediately after the change point, all the KPI values after the change point, etc.), or by another means. Thus, a threshold may be determined based on the nature of the KPI; for example, for CPU and memory utilization, a 5% threshold may be used to retain only operationally significant changes. Change points greater than the threshold value are retained, and change points less than the threshold value are discarded. After step 290, the method terminates. In another exemplary embodiment, for some KPIs no threshold may be used and all changes may be retained.

Figure 3:
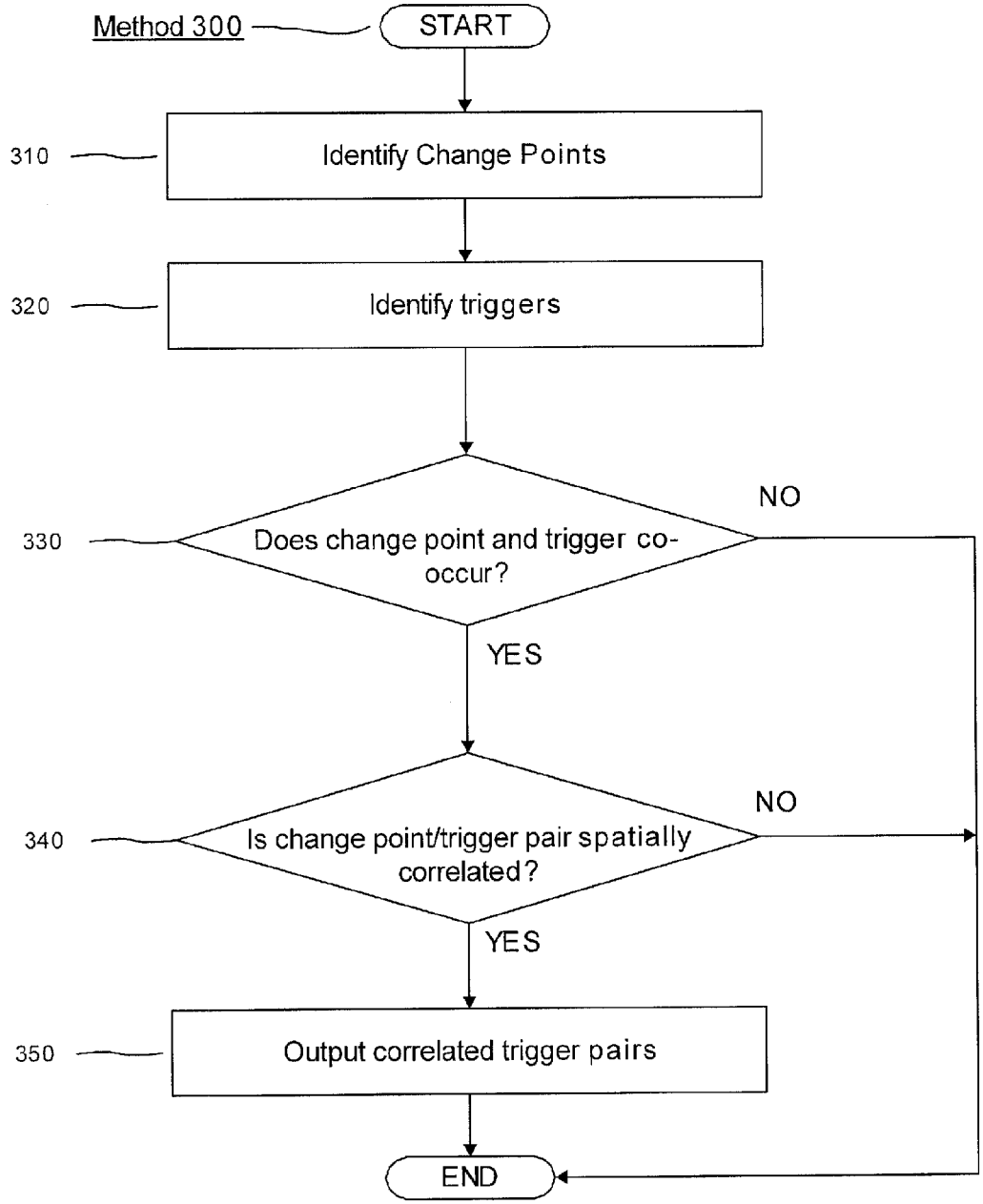
FIG. 3 shows and exemplary method for correlating change points with triggers.

After the change points have been identified, the change points may then be correlated to triggers. FIG. 3 illustrates an exemplary method 300 of correlating change points and triggers. In step 310, change points are identified, for example, using the method described above with reference to FIG. 2. In step 320, triggers are identified. As described above, a trigger may be an upgrade to the network. Exemplary methods of identifying triggers are disclosed in U.S. application Ser. No. 12/.

In step 330, it is determined whether a change point and a trigger co-occur. It is noted that this determination is made for all identified change points and triggers. One exemplary manner of determining whether a change point and a trigger co-occur is to specify a maximum timing lag. Those change points and triggers that occur within the timing lag are determined to co-occur. In one exemplary embodiment, the timing lag may be a time span of two days before the trigger to four days after the trigger. The timing lag may be user-configurable. If a change point is within the time lag of more than one trigger, further evidence may be considered in determining which trigger is correlated with a given change point. For those change points and/or triggers that do not meet this threshold, the process is complete.

As described above, the change point/trigger pairs that are generated by step 330 may be referred to as time or temporal correlation. However, some triggers may co-occur with change points by chance. To eliminate these false positives, the method 300 also includes a spatial correlation step 340. That is, a change point/trigger pair is considered to be spatially correlated if the trigger co-occurs with at least two change points with consistent signs (i.e., both positive, or both negative) at two different locations (e.g., routers). For example, given a trigger such as a BGP policy change and a first change point of a CPU increase on a first router and a second change point of a CPU decrease on a second router, it is not considered that the change point/trigger pairs are spatially correlated. This is because it is highly likely that the BGP policy change (trigger) is not the root cause for the CPU change and, therefore, this trigger may be eliminated. Conversely, if in the above example, the CPU changes were both positive or both negative, then these change point/trigger pairs would be considered to be spatially correlated. In step 350, the change point/trigger pairs that are spatially and temporally correlated are output.

The exemplary embodiments may therefore be able to identify change points in performance measurement series as described above. Identification may be accomplished automatically, without user action to suggest potential change points. Multiple change points may be identified in a single series where appropriate, and change points may be filtered based on both mathematical significance and their operational significance in the context of the type of measurement.

It is also noted that there may be a special case of KPIs that should be aggregated across multiple routers because their significance may be missed at the level of a single router (e.g., due to background noise at a single router). Such KPIs may only manifest themselves as significant at higher aggregation levels such as across the entire network or across certain types and/or locations of routers. For example, given a BGP policy change trigger, the number of BGP timer expirations may not change too much for each router, but the total change may become significant across all peering routers in the network. Thus, in certain situations, aggregation of KPIs may be useful in determining a behavior change in the network.

A challenge in aggregating KPIs for different routers is to determine the subset of routers for which the aggregation is performed. In one exemplary embodiment, a set of routers that have been determined to experience a behavior change based on a common trigger may be filtered out from the aggregation analysis. That is, it has already been determined that these routers have experienced a positive or negative change as a result of an identified trigger, therefore, these routers do not need to be further analyzed to determine if they contribute to some behavior change in the network. An exemplary method for determining a commonality in the behavior changes is described in U.S. application Ser. No. 12/. Thus, the routers that have experienced no change may be the initial scope of routers to be considered for aggregating.

However, the time alignment of the triggers also needs to be considered in aggregating routers. For example, triggers may be applied at different times in different network locations. For example, to avoid abrupt service disruption, an OS upgrade is typically applied to different routers in the network gradually over the course of several days or weeks. Those skilled in the art will understand that this can blur the precise location of the trigger and corresponding change points. Thus, the KPIs need to be time aligned to different instances of the same trigger. This time alignment ensures that after aggregation, any behavior changes can be attributed to the same type of trigger. Then, the exemplary analysis described above with reference to methods 200 and 300 may be carried out on these KPIs to determine if the aggregated KPIs of multiple routers indicate that the trigger is the root cause of the behavior change in the aggregated time series.

Those skilled in the art will understand that the above-described exemplary embodiments may be implemented in any number of manners, including, as a separate software module, as a combination of hardware and software, etc. For example, the methods 200 and 300 may be a program containing lines of code that are stored on a non-transitory computer readable storage medium that, when compiled, may be executed by a processor. The computing device, which may be referred to as an analysis device, that includes such lines of code may be connected to the network 101, for example, the control point 130 may include the functionality described above or it may be a separate device that receives the data from the network 101 and performs the functionality described herein.

It will be apparent to those skilled in the art that various modifications may be made to the exemplary embodiments, without departing from their spirit or scope. Thus, it is intended that the present disclosure cover modifications and variations provided they come within the scope of the appended claims and their equivalents.

What is claimed is:

1. A method, comprising:
   receiving, by an analysis device, an operating sample of data, the data indicating a plurality of performance measurements from a measurement point in a network, each of the plurality representing a single type of performance measurement made at the measurement point at each of a corresponding plurality of points in time;
   dividing, by the analysis device, the operating sample of data into a plurality of data points in a chronological order, each data point having a value corresponding to the performance measurements;
   ranking, by the analysis device, the data points in an ascending order;
   calculating, by the analysis device, a cumulative sum for each of the data points;
   calculating, by the analysis device, a change score for the set of data points, the change score indicating a change from a first one of the data points to a second one of the data points; and
   identifying, by the analysis device, a change point in the data set, if the change score exceeds a predetermined confidence level.

2. The method of claim 1, wherein the plurality of data points is a plurality of equally sized time bins.

3. The method of claim 2, wherein each time bin has a value corresponding to a composite of each of the performance measurements within the time bin.

4. The method of claim 3, wherein the composite is a mean value of the performance measurements within the time bin.

5. The method of claim 1, wherein the performance measurement is one of a CPU utilization, a memory utilization, a measurement of packet loss, a measurement of delay, and a measurement of protocol flaps.

6. The method of claim 1, wherein the cumulative sum for a selected one of the data points is calculated by adding the cumulative sum of an immediately previous data point in the chronological order to the rank of the selected data point and subtracting a mean of the ranks.

7. The method of claim 1, wherein the change score is the difference between a highest one of the cumulative sums and a lowest one of the cumulative sums.

8. The method of claim 1, wherein the identifying the change point comprises:
   generating, by the analysis device, a plurality of random permutations of the plurality of data points;
   calculating, by the analysis device, for each of the plurality of random permutations, a random permutation change score;
   determining, by the analysis device, a portion of the random permutation change scores that are less than the change score; and
   identifying, by the analysis device, the change point if the portion is greater than the predetermined confidence level.

9. The method of claim 1, further comprising:
   discarding, by the analysis device, the change point if a change magnitude corresponding to the change point is less than a filtering threshold, the filtering threshold relating to the type of the performance measurement.

10. The method of claim 1, further comprising:
    dividing, by the analysis device, the plurality of data points into two subsets of the plurality of data points if a change point is identified for the data set, the two subsets being the data points before the change point in the chronological order and the data points after the change point in the chronological order; and
    for each of the two subsets, determining, by the analysis device, whether the subset contains a further change point.

11. The method of claim 1, further comprising:
    correlating, by the analysis device, the change point with a trigger, wherein the trigger is a change to one of the network or a network device.

12. The method of claim 11, wherein the correlating further includes:

correlating, by the analysis device, a time of the change point with a time of the trigger; and correlating, by the analysis device, a spatial occurrence of the change point with the trigger, wherein the spatial occurrence includes a further change point being time correlated with the trigger, the further change point having the same sign as the change point.

13. A system, comprising:

a plurality of network devices, each network device to record an operating sample of data, the data indicating a plurality of performance measurements for each network device, each of the plurality of performance measurements representing a single type of performance measurement made at each network device at each of a corresponding plurality of points in time; and an analysis device to receive the operating sample of data from each of the network devices and divide the operating sample of data into a plurality of data points in a chronological order, each data point having a value corresponding to the performance measurements, ranking the data points in an ascending order, calculating a cumulative sum for each of the data points, calculating a change score for the set of data points, the change score indicating a change from a first one of the data points to a second one of the data points, and identifying a change point in the data set, if the change score exceeds a predetermined confidence level.

14. The system of claim 13, wherein the plurality of network devices include a router.

15. The system of claim 13, wherein the performance measurement is one of a CPU utilization, a memory utilization, a measurement of packet loss, a measurement of delay, and a measurement of protocol flaps.

16. The system of claim 13, wherein the analysis device identifies the change point by generating a plurality of random permutations of the plurality of data points, calculating, for each of the plurality of random permutations, a random permutation change score, determining a portion of the random permutation change scores that are less than the change score and identifying the change point if the portion is greater than the predetermined confidence level.

17. The system of claim 13, wherein the cumulative sum for a selected one of the data points is calculated by adding the cumulative sum of an immediately previous data point in the chronological order to the rank of the selected data point and subtracting a mean of the ranks.

18. The system of claim 13, wherein the change score is the difference between a highest one of the cumulative sums and a lowest one of the cumulative sums.

19. The system of claim 13, wherein the analysis device further correlates the change point with a trigger, wherein the trigger is a change to one of the network or a network device.

20. A tangible computer readable storage medium including a set of instructions executable by a processor, the set of instructions, when executed by the processor, causing the processor to perform operations comprising:

receiving an operating sample of data, the data indicating a plurality of performance measurements from a measurement point in a network, each of the plurality representing a single type of performance measurement made at the measurement point at each of a corresponding plurality of points in time;

dividing the operating sample of data into a plurality of data points in a chronological order, each data point having a value corresponding to the performance measurements;

ranking the data points in an ascending order;

calculating a cumulative sum for each of the data points;

calculating a change score for the set of data points, the change score indicating a change from a first one of the data points to a second one of the data points; and identifying a change point in the data set, if the change score exceeds a predetermined confidence level.

* * * * *